Dec. 22, 1959        G. M. ETNYRE        2,917,770
REMOTE CONTROL MECHANISM FOR AUTOMOBILE DOORS
Filed Oct. 28, 1957
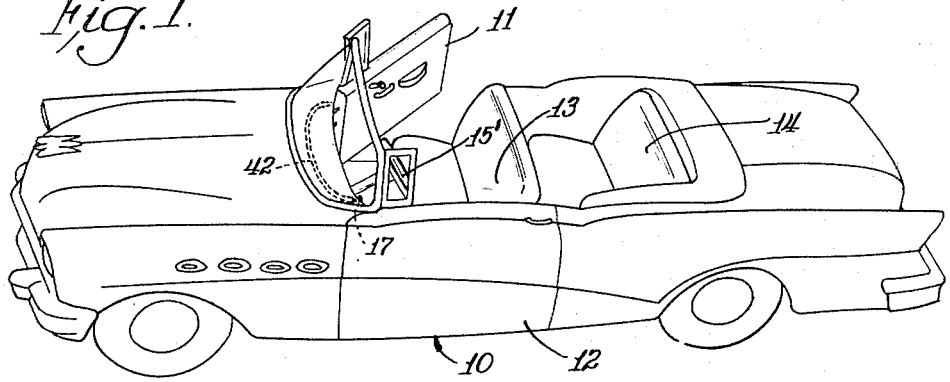
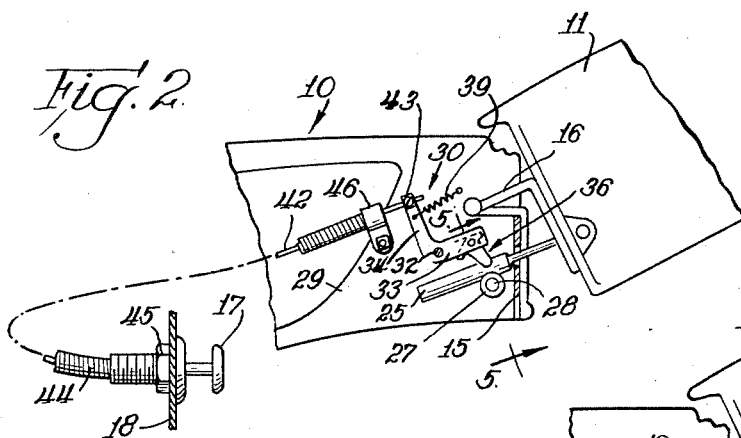
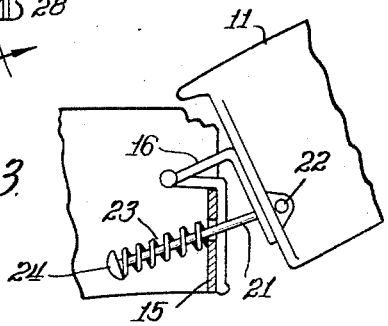
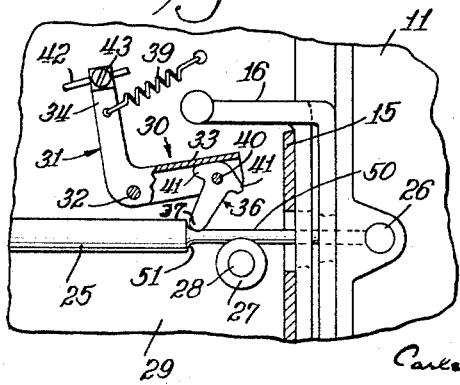
INVENTOR.
George M. Etnyre
BY
Carlsen, Pitzner, Hubbard & Wolfe
Attys

United States Patent Office 2,917,770
Patented Dec. 22, 1959

2,917,770

REMOTE CONTROL MECHANISM FOR AUTOMOBILE DOORS

George M. Etnyre, Oregon, Ill.

Application October 28, 1957, Serial No. 692,757

4 Claims. (Cl. 16—82)

The invention relates to control mechanism for the doors of automobiles and its primary object is to provide a simple and practical means by which the door of an automobile may be closed from a remote point.

A more specific object is to provide mechanism of the above general character by which the driver of an automobile may, without moving from his seat, securely close the door at the opposite side of the vehicle.

Another object is to provide control mechanism which effectively prevents accidental closing of the door while permitting it to be closed manually.

A further object is to provide door control mechanism that is simple and inexpensive to manufacture, that is durable and foolproof in use and that can be installed easily and quickly in existing automobiles.

Other objects and advantages of the invention will become apparent from the following detailed description of the preferred embodiment illustrated in the accompanying drawing in which Figure 1 is a perspective view of an automobile equipped with door control mechanism embodying the features of the invention;

Fig. 2 is a fragmentary horizontal sectional view through the body and door of the automobile illustrated in Fig. 1 showing the door latched in open position;

Fig. 3 is a fragmentary horizontal sectional view through the body and door showing one form of door biasing means;

Fig. 4 is a fragmentary sectional view similar to Fig. 2 showing the door closed; and Fig. 5 is a fragmentary sectional view taken in a plane substantially on the line 5—5 of Fig. 2.

While a preferred form of the invention has been shown and will be described in detail herein, it is not intended to limit the invention to the particular embodiment shown but the intention is to cover all modifications, adaptations and alternative constructions falling within the spirit and scope of the invention as defined in the appended claims.

For purposes of illustration the invention has been shown as installed in a passenger automobile 10 having doors 11 and 12 at opposite sides. In this particular type of automobile the doors are relatively wide and provide access both to the front or driver's seat 13 and the rear seat 14. It will be understood, of course, that the invention is applicable to other types of automotive vehicles equipped with doors.

In the exemplary automobile, the control mechanism constituting the invention is associated with the right hand door 11 which, in modern passenger cars, is usually too far away to be reached by a person sitting in the driver's seat 13 behind the steering wheel 15'. The door, as shown, has its front edge attached by hinges 16 to the frame member 15 constituting a part of the automobile body and defining the door opening. The hinges are constructed and mounted to allow the door to swing outwardly so that the passengers can enter or leave. A suitable latch (not shown) at the rear edge of the door locks it securely in closed position. An actuator 17 is conveniently installed on the dash or instrument panel 18 of the automobile within easy reach of the driver, thus permitting the driver to close the door without moving from his seat behind the steering wheel.

In carrying out the invention the door 11 is yieldably biased so that, while it may be easily opened manually, it tends to return to a closed position. Such biasing may be effected by hanging the door on the hinges 16 so that it will close by gravity even when the automobile is parked with a slight downhill slope. Whether or not the door is so hung, spring biasing means acting on the movable hinge member or on the door itself is desirably provided.

While the biasing means for the door may take various forms, that shown in Fig. 3 comprises a plunger 21 having one end pivotally secured to the door as at 22 and the other end extending through an aperture in the frame member 15. A compression spring 23 interposed between the frame member and a head 24 on the plunger yieldably urges the door toward closed position. It will be understood that the spring installed will be of sufficient power to close and latch the door when movements of the door are not restrained.

Further, in accordance with the invention, latch means is provided for retaining the door 11 in open position until it is reclosed by a positive action on the part of the driver or other person. Closure of the door by the driver is effected through the manipulation of the actuator 17 to release the latch and allow the biasing spring to swing the door closed. In the preferred form shown in Figs. 2 and 4, the latch mechanism comprises a latch member 25, in this instance, an elongated rod connected to and movable endwise with the door in its swinging between open and closed positions. In the particular installation shown, the latch rod 25 is pivotally connected to the front flange of the door by an integrally formed head 26 engaging in a complemental socket provided in the door flange. The rod extends forwardly from the door through an aperture in the frame member 15 and into the space between the outer body shell and inner lining of the automobile body. A grooved roller 27 journaled by a stud 28 on a member 29 forming a part of the frame structure of the body supports and guides the latch rod in its in and out movements.

Cooperating with the latch member 25 is a gripping mechanism 30 operable to restrain the latch member against forward movement and thus retain the door 11 in open position against the force exerted by the biasing spring 23. The gripping mechanism is constructed and arranged for release by the actuator 17 and also by the manual application of closing pressure to the door 11. In the preferred form shown, it includes a bell crank lever 31 supported at one side of the latch rod 25 to rock about an axis perpendicular to the axis of the rod. The bell crank lever may conveniently comprise a sheet metal stamping and is preferably channel shaped in section to afford strength and rigidity without excessive weight. Support for the lever is provided by a pivot pin 32 anchored to a suitable part of the body such as the frame member 29. The pin 32 is located so that one leg 33 of the bell crank lever extends generally parallel to the rod 25 as it rests on the guide roller 27. The other leg 34 extends outwardly from the rod.

For restraining movement of the latch rod 25, the arm 33 of the bell crank carries a catch or dog 36 having a nose portion 37 of friction generating material positioned to engage the side of the rod opposite the guide roller 27. While the dog may be formed of rubber or other resilient material having the desired friction characteristics, the preferred construction comprises a metal shank 38 with the nose formed of resilient friction material as shown in Fig. 5. A spring 39 acting on the arm 33 yieldably urges the bell crank in a direction to press the nose 37 of the dog against the side of the rod, thus tending to clamp the rod between the dog and the roller 27.

To enable the dog to perform its restraining action and yet yield to permit forward movement of the rod 25 when closing pressure is manually applied to the door 11, the dog is pivotally mounted on the lever arm 33 as by a pin 40 to swing over center between two limit positions. The pivotal axis is located at one side of the rod and substantially perpendicular to the longitudinal axis of the rod. Ears 41 projecting laterally from opposite sides of the dog cooperate with the crank arm to define the limit positions of the dog on opposite sides of a plane normal to the rod and passing through the pivotal axis of the dog.

By reason of its frictional engagement with the latch rod 25, the dog 36 is rocked counterclockwise to the position shown in Fig. 2 in the rearward movement of the rod as the door 11 is opened. The inclination of the dog and the direction of movement of the rod allows the latter to move with a minimum of resistance. However, when force is applied to the rod in the opposite direction, the frictional engagement between the dog and the rod is substantially increased and movement of the rod is strongly resisted. The amount of resistance opposed to such movement and thus to the closure of the door 11 is determined by the power of the spring 39 and, in practice, a spring is selected that will effectively hold the door open against the force exerted by gravity and by the biasing spring 23.

The restraining action of the gripping mechanism may be terminated to allow the door 11 to swing to closed position by rocking the bell crank 31 in a counterclockwise direction. Such rocking of the bell crank retracts the dog so that its frictional grip on the rod 25 is reduced sufficiently to allow the biasing spring 23 to swing the door. Any suitable means may be utilized for rocking the bell crank such as the actuator 17 shown which comprises a button fixed to one end of a flexible tension member or wire 42 having its other end rigidly connected to the arm 34 of the bell crank as by a clamping screw 43. To permit location of the actuator in a conveniently accessible position, the wire 42 is enclosed in a flexible sheath 44 anchored at one end in a fitting 45, in this instance, on the instrument panel 18 and at the other end in a bracket 46 bolted or otherwise rigidly attached to the automobile body.

The construction and arrangement of the latch mechanism permits the door 11 to be closed manually independently of the actuator 17 when desired. Thus, when the door is in the open position shown in Fig. 2, application of a closing pressure greater than that exerted by the biasing spring 23 will act to rock the dog 36 over center to the position shown in Fig. 4. The dog is thus inclined in the direction in which the rod must move in closing the door and the resistance opposed to such movement of the rod 25 is materially reduced so that the door can be easily swung the rest of the way to closed position.

Provision is made for relieving pressure on the dog 36 when the door is closed and for insuring its return to the rearwardly inclined latching position as the door is opened. For this purpose the end portion 50 of the rod 25 engaged by the guide roller 27 and the dog 36 when the door is closed is reduced in diameter as shown in Fig. 4. The pressure of the dog against the rod is thus minimized. Moreover, a shoulder 51 is presented on the rod for engagement with the dog as the door is opened, thus insuring rocking of the dog to its alternate or latching position.

In the operation of an automobile equipped with the control mechanism of the invention, the door 11 may be opened or closed in the usual manner by manual application of pressure in the opening or closing direction. The door, when opened, is held securely in that position until some positive action is taken to close it. This may be manual closing of the usual character. However, if a passenger should neglect to close the door after leaving, the driver may bring about closure by simply pulling out the button 17 of the actuator. This releases the latch mechanism holding the door open and permits a strong biasing spring or the like to swing the door closed. The driver is thus able to securely close the door without leaving the driver's seat or without attempting to reach across the seat to grasp a projecting part of the door.

I claim as my invention:

1. Latch means for use with a door hinged to the body of an automobile comprising, in combination, a plunger secured to the door for endwise movement responsive to the opening and closing of the door, a bell crank lever pivotally supported on the body with one arm extending along one side of said plunger, a dog pivoted on said arm with its nose portion positioned to frictionally engage the side of said plunger, spring means urging said bell crank in a direction to press said dog against said plunger, said plunger acting to swing said dog to one position when moved by the opening of the door, said dog in said one position frictionally resisting movement of the plunger in the door closing direction, manually operable means for rocking said bell crank lever in a direction to retract said dog and release said plunger for movement, said dog when engaging said plunger in said one position being swingable to an alternate position to materially reduce the resistance to movement of said plunger by application to the door of a closing force exceeding that normally acting on the door.

2. Latch means for use with a door hinged to the body of an automobile comprising, in combination, a plunger pivotally secured to the door for endwise movement in the opening and closing of the door, roller means mounted on the automobile body in position to engage one side of the plunger to guide it in its movements, a bell crank lever pivotally supported on the body with one arm extending along the side of the plunger opposite the side engaged by said roller, a dog supported on said one arm of the bell crank lever substantially in alinement with said roller, spring means urging said bell crank in a direction to carry said dog toward said roller and frictionally clamp said plunger against movement in a door closing direction, and means operable manually for rocking said bell crank against the action of said spring in a direction to retract said dog and thereby release said plunger and the door for closing movement.

3. Latch means for use with a door hinged to the body of an automobile comprising, in combination, a plunger pivotally secured to the door for endwise movement in the opening and closing of the door, roller means mounted on the automobile body in position to engage one side of the plunger to guide it in its movements, a bell crank lever pivotally supported on the body with one arm extending along the side of the plunger opposite the side engaged by said roller, a catch mounted on said one arm of the bell crank lever in position to engage said plunger in opposed relation to said roller means when the bell crank is rocked in one direction, said catch having a friction generating tip portion engageable with the plunger, spring means urging said bell crank lever in a direction to press said catch against said plunger and thereby resist movement of the plunger and the door in a closing direction, and means operable manually for rocking said bell crank lever in a direction to retract said catch and thereby release the plunger and the door for movement in a closing direction.

4. Latch means for use with a door hinged to the body of an automobile comprising, in combination, a plunger pivotally secured to the door for endwise movement in the opening and closing of the door, roller means mounted on the automobile body in position to engage one side of the plunger to guide it in its movements, a bell crank lever pivotally supported on the body with one arm extending along the side of the plunger opposite the side engaged by said roller, a dog pivoted at one end on said one arm of the bell crank lever and having its other end positioned to engage the side of said plunger opposite said roller means, spring means urging said bell crank lever in a direction to press said dog against said plunger, said plunger acting in the movement of the door in an opening direction to swing said dog on its pivot to an inclined position in which it opposes relatively little resistance to continued movement of the plunger in that direction but opposes materially greater resistance to movement of the plunger in the opposite direction, said plunger being operative to swing said dog on its pivot to an oppositely inclined position upon application to the door of a closing force exceeding that normally acting on the door.

References Cited in the file of this patent

UNITED STATES PATENTS

| | | |
|---|---|---|
| 935,545 | Pilcher | Sept 28, 1909 |
| 1,595,555 | Kooser | Aug. 10, 1926 |
| 1,853,517 | Finnerty | Apr. 12, 1932 |
| 2,117,060 | Gouse | May 10, 1938 |
| 2,646,590 | Milton | July 28, 1953 |